(12) United States Patent
Huang et al.

(10) Patent No.: US 7,332,710 B2
(45) Date of Patent: Feb. 19, 2008

(54) METHOD AND APPARATUS FOR DETERMINING A SCAN BOUNDARY IN AN IMAGE SCANNER

(75) Inventors: Yin-Chun Huang, Hsin-Chu (TW); Chin-Lien Chang, Hsin-Chu (TW)

(73) Assignee: Transpacific IP Ltd., Taipei (TW)

( * ) Notice: Subject to any disclaimer, the term of this patent is extended or adjusted under 35 U.S.C. 154(b) by 0 days.

(21) Appl. No.: 11/504,213

(22) Filed: Aug. 14, 2006

(65) Prior Publication Data

US 2007/0018087 A1    Jan. 25, 2007

Related U.S. Application Data

(63) Continuation of application No. 10/385,715, filed on Mar. 12, 2003, now Pat. No. 7,091,461.

(30) Foreign Application Priority Data

Jul. 25, 2002    (TW) ................... 091116649

(51) Int. Cl.
*H01J 3/14*    (2006.01)
(52) U.S. Cl. .................... 250/235; 250/208.1
(58) Field of Classification Search .............. 250/235, 250/208.1, 205, 559.4; 358/475, 486
See application file for complete search history.

(56) References Cited

U.S. PATENT DOCUMENTS

| | | | | |
|---|---|---|---|---|
| 4,260,248 | A | * | 4/1981 | Murata et al. ............ 355/60 |
| 4,338,020 | A | | 7/1982 | Yukawa et al. |
| 4,737,748 | A | * | 4/1988 | Ito ............................ 399/14 |
| 4,749,872 | A | * | 6/1988 | Asada et al. ............. 358/496 |
| 5,786,590 | A | * | 7/1998 | Lin ......................... 250/208.1 |

\* cited by examiner

*Primary Examiner*—Que T Le
(74) *Attorney, Agent, or Firm*—Stolowitz Ford Cowger LLP

(57) ABSTRACT

A light source control method and apparatus of an image scanner is disclosed. The invention utilizes a determination means and an illumination control device to perform partial or full illumination and adjust brightness so that the light source can be operated more efficiently and more economically.

27 Claims, 7 Drawing Sheets

METHOD AND APPARATUS FOR DETERMINING A SCAN BOUNDARY IN AN IMAGE SCANNER

CROSS-REFERENCE TO RELATED APPLICATIONS

This application is a continuation of U.S. application Ser. No. 10/385,715, filed Mar. 12, 2003, now U.S. Pat. No. 7,091,461 entitled "LIGHT SOURCE CONTROL METHOD AND APPARATUS OF IMAGE SCANNER."

BACKGROUND OF THE INVENTION

1. Field of the Invention

The present invention relates to a light source control method and apparatus of an image scanner, and more particularly to a light source control method and apparatus of an image scanner which can automatically perform partial or full illumination and adjust brightness according to the scan area and the scan mode.

2. Description of the Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

In conventional image scanner, the light source always maintains constant illumination during scanning. However, constant illumination of the light source wastes power and is lack of efficiency when only part of scan area is needed to be scanned. Furthermore, constant illumination of the light source for multiple scan modes (Color, Gray and Line art) of an image scanner is not economical either. Hence it is desirable to provide a light source control method of an image scanner which can automatically perform partial or full illumination and adjust brightness according to the scan area and the scan mode so as to utilize the light source more efficiently and economically.

SUMMARY OF THE INVENTION

It is therefore an object of the invention to provide a light source control method and apparatus of an image scanner which can automatically perform partial or full illumination and adjust brightness.

It is another object of this invention to provide a light source control method and apparatus of an image scanner that can utilize the light source more efficiently and economically.

To achieve these objects, and in accordance with the purpose of the invention, the invention provide a light source control method of an image scanner. The method comprises the following steps. First of all, a light source having a plurality of sections is provided, wherein power supplies of said sections are controlled separately. Then a scan boundary of a document is determined. Finally, a portion of said sections which cover said scan boundary are provided with electric powers.

In another embodiment, the method comprises the following steps. A light source having at least two sections is provided, wherein power supplies of said sections are controlled separately. Then a first section of said sections is provided with electric powers. Next said light source is moved to scan a document along a first direction. Then a second section of said sections is provided with electric powers. Finally, said light source is moved to scan said document along a second direction.

In another embodiment, the method comprises the following steps. First of all, a light source having a plurality of sections is provided, wherein power supplies of said sections are controlled separately. Then a document is preview scanned to generate a preview image of said document. Next a scan boundary of said document is determined by said preview image and a portion of said sections which cover said scan boundary is provided with electric powers.

In another embodiment, the method comprises the following steps. First of all, a light source having at least two sections and image sensors are provided, wherein power supplies of said sections are controlled separately. Then said light source and said image sensors are moved to a scan line. Next a first section of said light source is provided with electric power to scan a first portion image of said scan line. Then a second section of said light source is provided with electric power to scan a second portion image of said scan line. Finally, said first portion and said second portion images of said scan line are processed to generate an image of said scan line.

In another embodiment, the method comprises the following steps. First of all, a light source having at least two sections and image sensors are provided, wherein power supplies of said sections are controlled separately. Then a first section of said light source is provided with electric power to scan a document. Next said light source and said image sensors are moved from a start position to scan a first portion of said document. Then said light source and said image sensors are moved back to said start position after scanning said document. Next a second section of said light source is provided with electric power to scan said document. Then said light source and said image sensors are moved from said start position to scan a second portion of said document. Finally, images of said first portion and said second portion of said document are processed to generate an image of said document.

In another embodiment, the method comprises the following steps. First of all, a light source having a controllable power supply is provided. Then a default scan mode of the image scanner is accessed and said light source is provided with electric powers according to said scan mode to generate a bright level of said light source of said scan mode.

In another embodiment, a light source control apparatus of an image scanner is provided. The light source control apparatus comprises a light source having a plurality of light-emitting devices divided into a plurality of sections, a scan boundary determining portion for determining a scan boundary and a power supply control means for providing and controlling said sections of said light source with electric power, wherein power supplies of said sections can be controlled respectively.

In another embodiment, a light source control apparatus of an image scanner is provided. The light source control apparatus comprises a light source having a plurality of light-emitting devices divided into at least two sections, and a power supply control means for providing and controlling said sections of said light source with electric power, said power supply control means provides a first section of said light source with electric power when said light source moves alone a first direction to scan a document, and provides a second section of said light source with electric power when said light source moves alone a second direction to scan said document, wherein power supplies of said sections can be controlled respectively.

In another embodiment, the method comprises the following steps. First of all, a light source having a plurality of light-emitting devices divided into at least two sections is provided, wherein power supplies of said sections can be controlled respectively. Then a scan boundary is determined. Next a default scan mode of the image scanner is accessed. Then a portion of said sections which cover said scan boundary is provided with electric power. Finally, said light source is provided with electric powers according to said scan mode to generate a bright level of said light source of said scan mode.

In another embodiment, the method comprises the following steps. First of all, a light source having a plurality of light-emitting devices divided into at least two sections is provided, wherein power supplies of said sections can be controlled respectively. Then a default scan mode of the image scanner is accessed. Next a first section of said light source is provided with electric power according to said scan mode to generate a bright level of said light source of said scan mode to scan a document. Then said light source and said image sensors are moved alone a first direction to scan said document. Next a second section of said light source is provided with electric power according to said scan mode to generate said bright level. Finally, said light source and said image sensors are moved alone a second direction to scan said document.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method and the apparatus described below do not cover a complete system and method. The present invention can be practiced in conjunction with various software and hardware that are used in the art, and only so much of the commonly practiced components and steps are included herein as are necessary to provide an understanding of the present invention.

The present invention will be described with six embodiments in detail with reference to the accompanying drawings. It should be noted that the drawings are in greatly simplified form.

Figure 1:
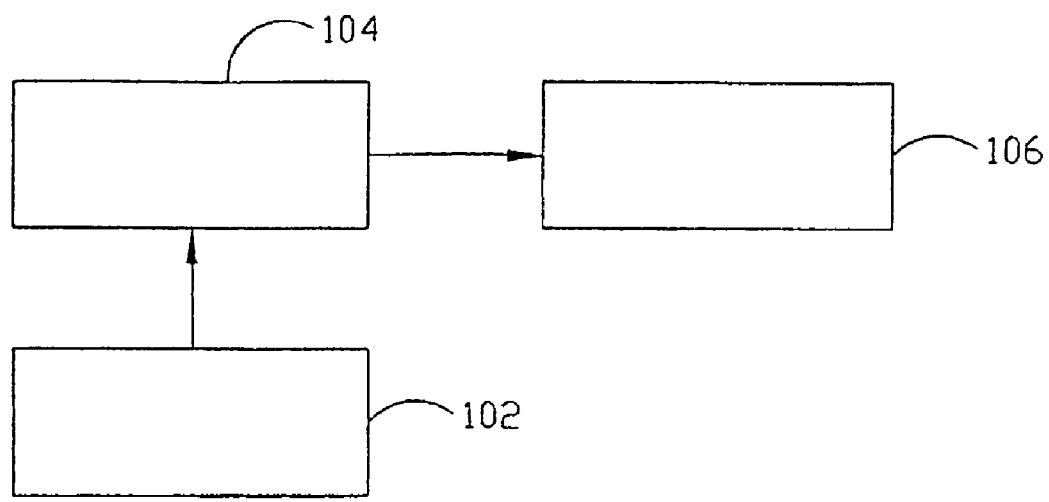
FIG. 1 shows a light source control apparatus according to one embodiment of this invention.
Figure 2:
FIG. 2 shows a light source divided into three sections and a document placed on a scan area of an image scanner.
Figure 2:
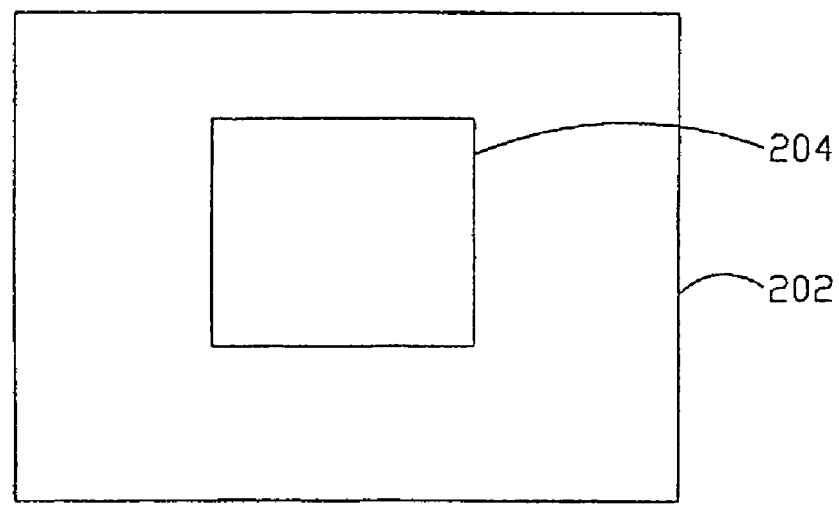
Figure 3:
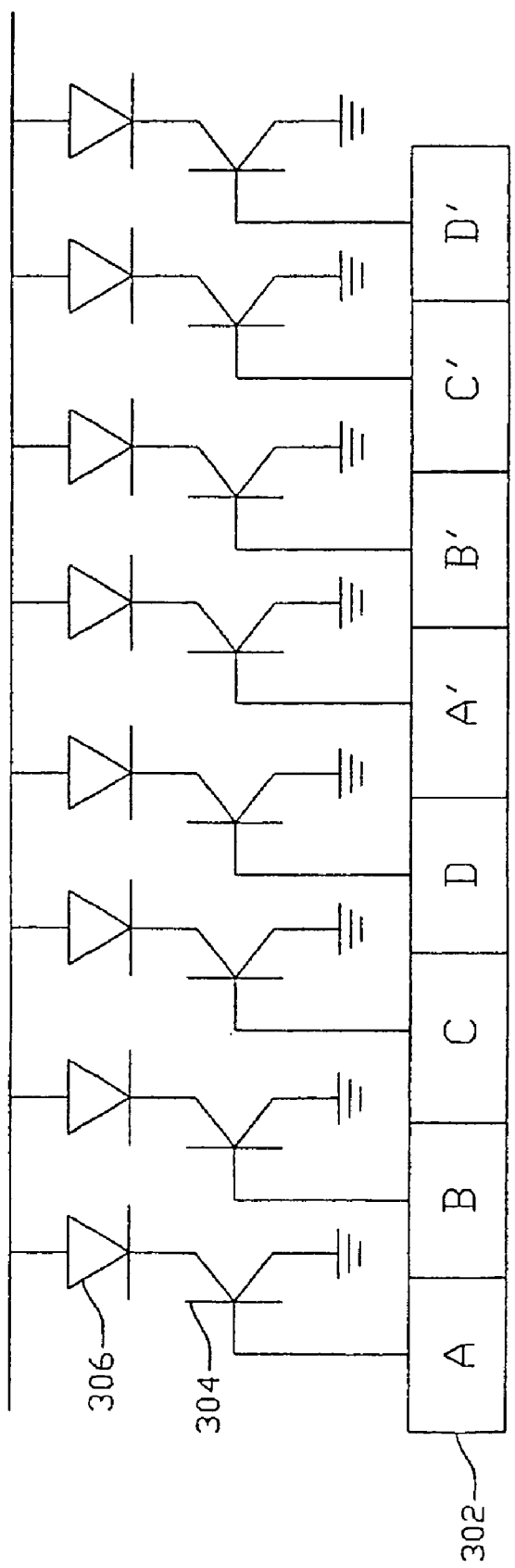
FIG. 3 shows one embodiment of the power supply control means.

In one embodiment of this invention, the invention provides a light source control method and apparatus of an image scanner. FIG. 1 shows a light source control apparatus having a light source 106, a scan boundary determining portion 102 and a power supply control means 104. The light source 106 includes a plurality of linearly arranged light-emitting devices. The light source 106 is divided into a plurality of sections and the light-emitting devices of each section are separately controlled by the power supply control means 104. The light-emitting device of the light source 106 comprises a light-emitting diode (LED). Moreover, each light-emitting device can also be set as one section of the light source 106. FIG. 3 shows one embodiment of the power supply control means 104. The power supply of a light-emitting diode 306 is controlled by a transistor 304, and the transistor 304 is used as a switch. The turn-on/turn-off of the transistor 304 is controlled by digital signals (1 or 0) from a shift register 302. For example, if a signal is applied to the transistor 304 and turns on the gate of the transistor 304 thereby conducts an electric current through the light-emitting diode 306 and renders the light-emitting diode 306 illuminating. By using software or firmware, all light-emitting diodes 306 can be divided into a plurality of sections or each light-emitting diode 306 can be set as a section since each light-emitting diode 306 corresponds to a transistor 304 and each transistor 304 is controlled by the shift register 302. As shown in FIG. 2, a light source 206 is divided into three sections, and a document 204 is placed on a scan area 202 of an image scanner. The light source control method of this invention divides the light source 206 into a plurality of sections, wherein the power supply of each section is separately controlled. Then a preview image of the document 204 is generated by a preview scan. The scan boundary determining portion 102 comprises a user interface and one user can utilize the user interface to select the scan area or the scan boundary of the document 204 according to the preview image of the document 204. The scan area or the scan boundary can also be determined by other methods. The method and apparatus for determining scan boundary of this invention are example only. The power supply control means 104 provides the sections of the light source 206 covering the width of the scan boundary of the document 204 with electric power. For example, if the width of the scan boundary of the document 204 is 216 millimeters and the light source 206 has 50 light-emitting devices, then the location of the first light-emitting device is at 216/50 and the locations of other light-emitting devices can also be determined. Since only those light-emitting devices within the sections covering the width of the scan boundary of the document 204 are needed to be illuminated, less electric power is needed. Furthermore, because only the scan area or the scan boundary of the document 204 generate images, the image processing of the area outside the scan boundary of the document 204 is omitted. Moreover, due to the selective and sectional illumination of the light source, limited electric power can be utilized more efficiently and applied to the section covering the width of the scan boundary of the document only, and the scanning speed can be upgraded.

Figure 4:
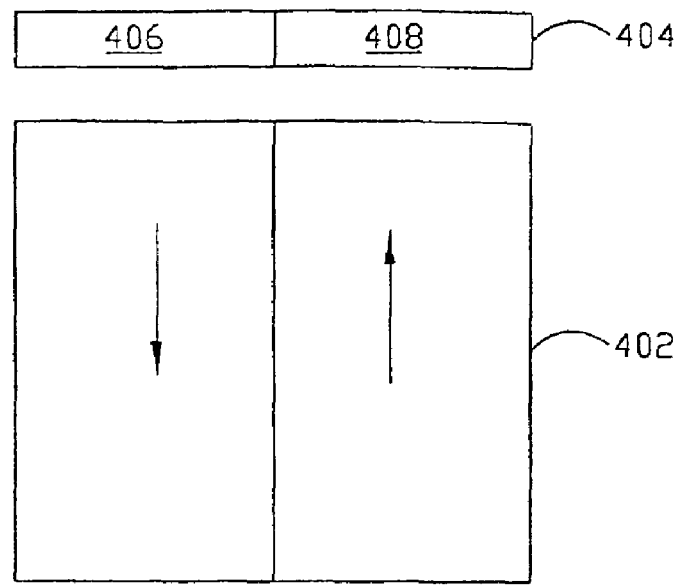
FIG. 4 shows one embodiment of this invention.

In a second embodiment of this invention, the invention provides a second light source control method of an image scanner. As the light source control apparatus shown in FIG. 1, in this embodiment, the light source 106 is divided into two sections, wherein the power supply of each section is separately controlled by the power supply control means 104. While the light source moves to scan a document along the scanning direction, the power supply control means 104 controls and provides one section with electric power only to illuminate a first half of the document. When the light source moves back to the start position, the power supply control means 104 controls and provides the other section with electric power only to illuminate the other half of the document. As shown in FIG. 3, the power supply of a light-emitting diode 306 is controlled by a transistor 304, and the turn-on/turn-off of the transistor 304 is controlled by digital signals (1 or 0) from a shift register 302. By using software or firmware, all light-emitting diodes 306 can be divided into two sections since each light-emitting diode 306 corresponds to a transistor 304 and each transistor 304 is controlled by the shift register 302. As shown in FIG. 4, a light source 404 is divided into two sections 406 and 408 to illuminate a scan area 402. When proceeding scan, the light source 404 moves along the scanning direction and only section 406 is provided with electric power or illuminated to scan one half of a document, and the light source 404 moves back to the start and only section 408 is provided with electric power or illuminated to scan the other half of a document. Due to the selective and sectional illumination of the light source, limited electric power can be utilized more efficiently and the scanning speed can be upgraded.

In a third embodiment of this invention, the invention provides a third light source control method of an image scanner. As shown in FIG. 2, a light source 206 is divided into three sections, and a document 204 is placed on a scan area 202 of an image scanner. The light source control method of this invention divides the light source 206 into a plurality of sections, wherein the power supply of each section is separately controlled. The dividing and control embodiment of the light source is shown in FIG. 3. The power supply of a light-emitting diode 306 is controlled by a transistor 304, and the transistor 304 is controlled by the shift register 302. By using software or firmware, all light-emitting diodes 306 can be divided into a plurality of sections or each light-emitting diode 306 can be set as a section since each light-emitting diode 306 corresponds to a transistor 304 and each transistor 304 is controlled by the shift register 302. Then a preview image of the document 204 is generated by a preview scan and is transmitted to image sensors of an image scanner. The optical signals received by the image sensors are then converted to analog signals, and the analog signals are finally converted to digital signals. The digital signals comprise the digital signals of the document 204 as well as the digital signals of the area which is not occupied by the document 204. By using the digital signals of the document 204 and the digital signals of the area which is not occupied by the document 204, the scan boundary of the document 204 can be determined. For example, the variation of bright levels of pixels across the scan boundary can be used to recognize the scan boundary. The power supply control means 104 then provides the sections of the light source 206 covering the width of the scan boundary of the document 204 with electric power to illuminate the document 204. Moreover, due to the selective and sectional illumination of the light source, limited electric power can be utilized more efficiently and applied to the section covering the width of the scan boundary of the document only, and the scanning speed can be upgraded.

Figure 5:
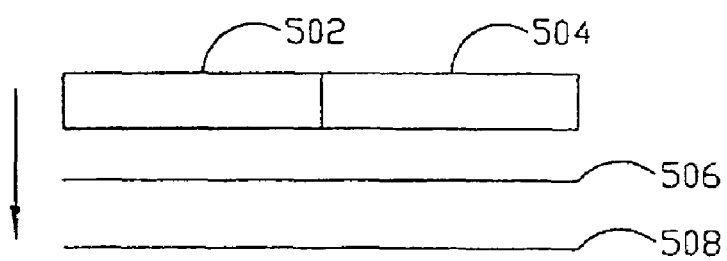
FIG. 5 shows one embodiment of this invention.

In a fourth embodiment of this invention, the invention provides a fourth light source control method of an image scanner. A light source of an image scanner is divided into at least two sections. The dividing and control embodiment of the light source is shown in FIG. 3. The power supply of a light-emitting diode 306 is controlled by a transistor 304, and the transistor 304 is controlled by the shift register 302. By using software or firmware, a light source can be divided into two sections 502 and 504 as shown in FIG. 5. When proceeding scan, the light source and image sensors move to a scan line 506 and the sections 502 and 504 are separately and sequentially provided with electric power to illuminate the scan line 506. While the light source and image sensors move to a scan line 508 and the sections 502 and 504 are separately and sequentially provided with electric power to illuminate the scan line 508, the image signals of the scan line 506 are processed. Then the light source and image sensors move to the next scan line and repeat the processes set forth until all scan lines are scanned.

Figure 6:
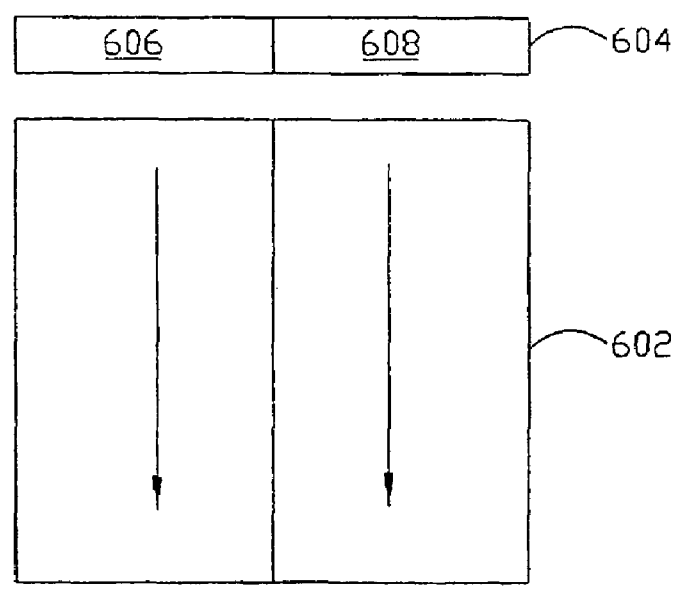
FIG. 6 shows one embodiment of this invention.

In a fifth embodiment of this invention, the invention provides a fifth light source control method of an image scanner. A light source of an image scanner is divided into at least two sections. The dividing and control embodiment of the light source is shown in FIG. 3. The power supply of a light-emitting diode 306 is controlled by a transistor 304, and the transistor 304 is controlled by the shift register 302. By using software or firmware, a light source 604 can be divided into two sections 606 and 608 to illuminate a scan area 602 as shown in FIG. 6. When proceeding scan, the light source 604 and image sensors move along the scanning direction and only section 606 is provided with electric power or illuminated to scan one half of a document, and the light source 604 and the image sensors move back to the position of start. Then the light source 604 and the image sensors move along the scanning direction again and only section 608 is provided with electric power or illuminated to scan the other half of a document. Due to the selective and sectional illumination of the light source, limited electric power can be utilized more efficiently and the scanning speed can be upgraded.

Figure 7:
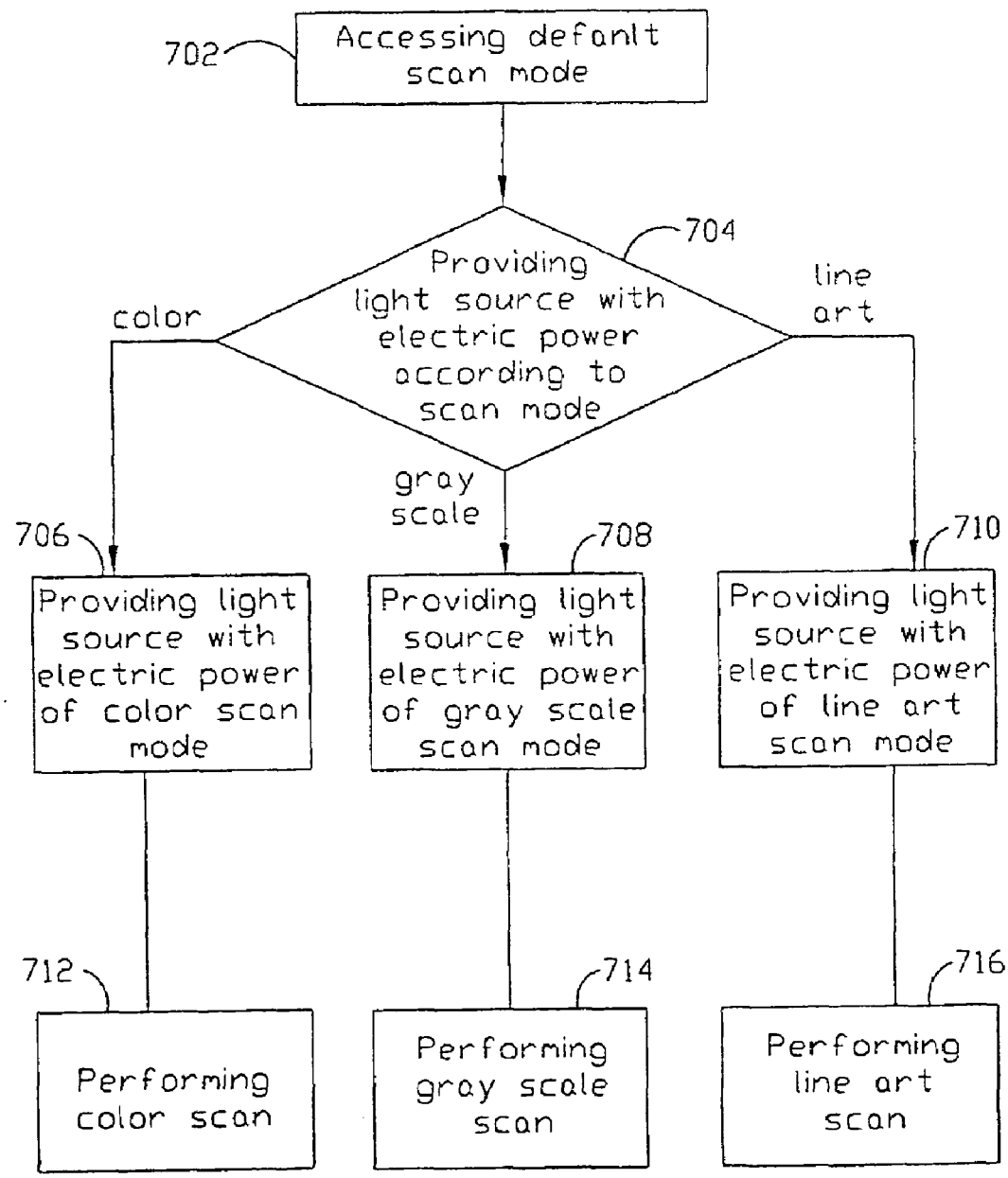
FIG. 7 shows a flow chart of one embodiment of this invention.

In a sixth embodiment of this invention, the invention provides a sixth light source control method of an image scanner. The control embodiment of the light source is shown in FIG. 3. The power supply of a light-emitting diode 306 is controlled by a transistor 304, and the transistor 304 is controlled by the shift register 302. By using software or firmware, the power supply of a light source can be control according to scan modes of an image scanner. Scan modes of an image scanner comprise color scan mode, gray scale scan mode and line art scan mode. FIG. 7 shows a flow chart of this embodiment. In step 702, default scan mode of an image scanner is accessed. Then in step 704, according to the default scan mode, the power supply of a light source is provided, wherein color scan mode uses the brightest illumination of the light source and thereby utilizes most power, and the line art scan mode uses the dimmest illumination of the light source and thereby utilizes less power. Next in steps 706, 708 and 710, the brightness of the light source is adjusted by controlling the power supply of the light source according to the default scan mode. Then in steps 712, 714 and 716, color mode scan, gray scale mode scan and line art mode scan are performed in accordance with the default scan mode.

Figure 8A:
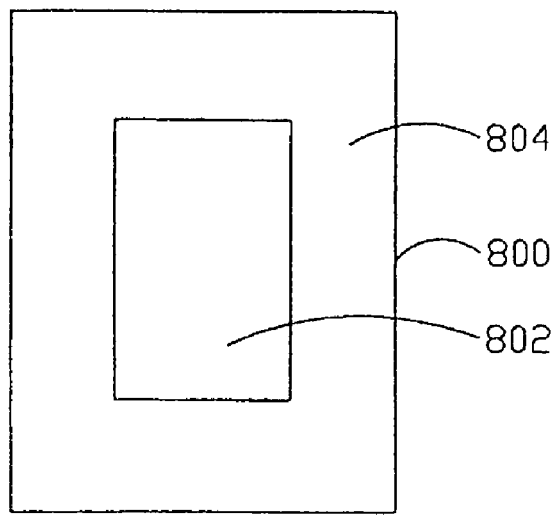
FIGS. 8A and 8B show a first surface and a second surface of a holder.
Figure 8B:
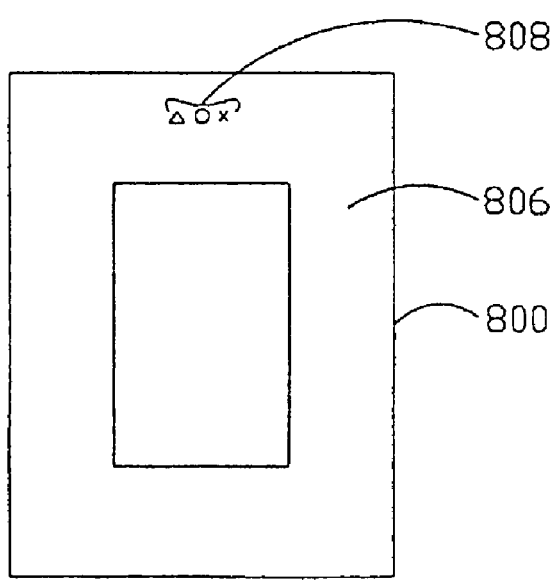

In a seventh embodiment of this invention, the invention provides a holder to select scan areas. FIGS. 8A and 8B show a first surface 804 and a second surface 806 of a holder 800. The holder 800 is placed on a scan window of an image scanner during scanning. The holder 800 pre-selects and determines a maximum scan area 802. The first surface 804 contacts with the document to be scanned while the second surface 806 contacts with the scan window of the image scanner during scanning. The second surface 806 includes a pattern 808 corresponding to the scan area 802. Each pattern represents a corresponding maximum scan area. The pattern 808 is scanned by a scan head of the image scanner to determine the scan area during scanning. The holder 800 can also be utilized in the embodiments of the invention mentioned above to determine scan areas or scan boundaries. The pattern 800 can be scanned during the original calibration of an image scanner. That is, the pattern 800 is scanned to determine scan areas or scan boundaries after scanning a calibration target during the calibration of an image scanner.

Figure 9A:
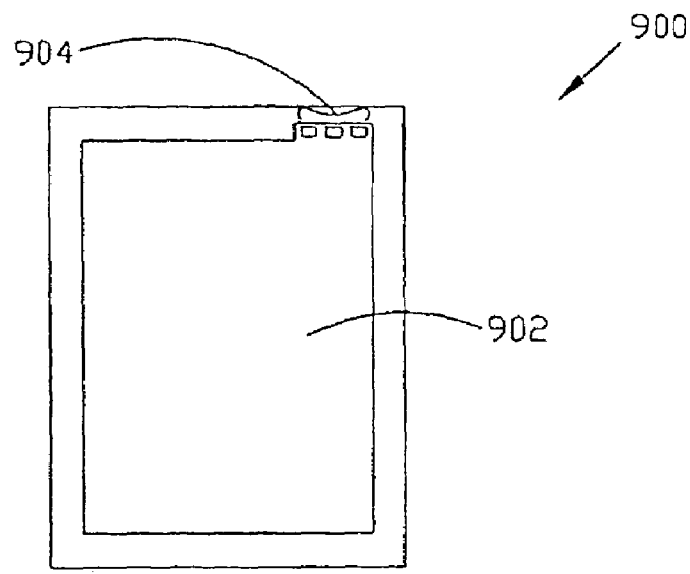
FIG. 9A shows a housing 900 of a scanner.
Figure 9B:
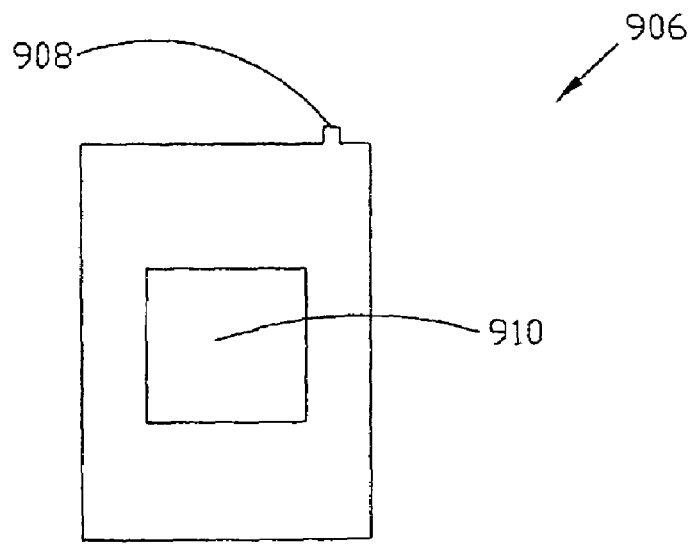
FIG. 9B to 9D show three holders having three different scan areas respectively.
Figure 9C:
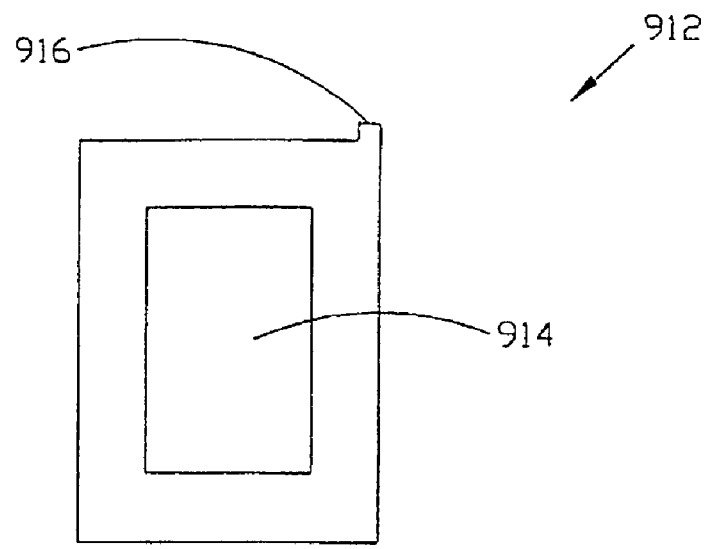
Figure 9D:
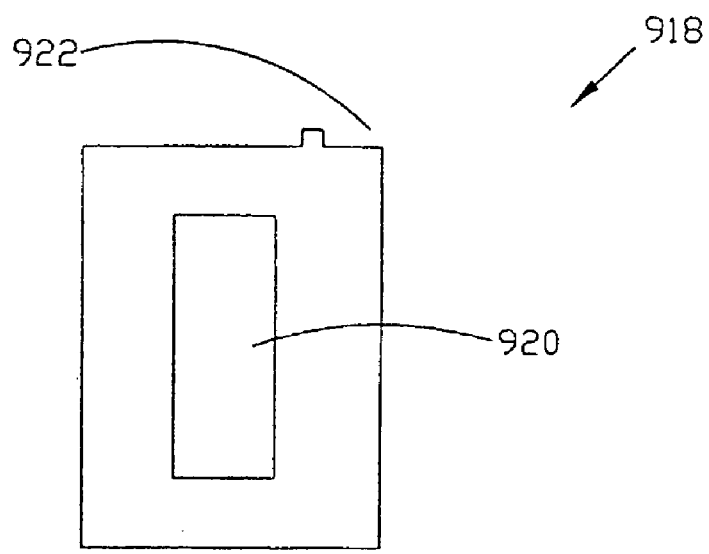

In an eighth embodiment of this invention, the invention provides a holder and a housing of a scanner with sensors to select scan areas. FIG. 9A shows a housing 900 of a scanner. The housing 900 has a scan window 902 and a sensor area 904 having sensors. FIG. 9B to 9D show holders 906, 912 and 918 having scan areas 910, 914 and 920 respectively. The holders 906, 912 and 918 also comprise bulge portions 908, 916 and 922 respectively. The bulge portions 908, 916 and 922 correspond to the sensor area 904 and each bulge portion is used to cover a corresponding sensor of the sensor area 904. The sensors of the sensor area 904 correspond to the scan areas 910, 914 and 920 of the holders 906, 912 and 918 respectively. During scanning, one of the holders 906, 912 and 918 is placed on the housing 900 to cover the sensor corresponding to one of the bulge portions 908, 916 and 922, and determine the scan area by the scan areas 910, 914 and 920. This embodiment can also be applied in the embodiments of the invention mentioned above to determine scan areas or scan boundaries.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claim is:

1. A method, comprising:
   providing a document holder on a scan window of an image scanner;
   scanning a pattern on the document holder; and
   determining a scan boundary based on the scanned pattern.

2. The method of claim 1, wherein the pattern corresponds to a particular scan boundary.

3. The method of claim 1, wherein scanning a pattern on a document holder comprises scanning one of a plurality of patterns, wherein each of the plurality of patterns corresponds to a scan boundary, and further wherein the scan boundary is determined by sensing which of the plurality of patterns is present on the document holder.

4. An apparatus, comprising:
   means for holding a document on a scan window of an image scanner;
   means for scanning a pattern on the means for holding a document; and
   means for determining a scan boundary based on the scanned pattern.

5. The apparatus of claim 4, wherein the pattern corresponds to a particular scan boundary.

6. The apparatus of claim 4, wherein the means for scanning a pattern comprises means for scanning one of a plurality of patterns, wherein each of the plurality of patterns corresponds to a scan boundary, and further wherein the scan boundary is determined by sensing which of the plurality of patterns is present on the document holder.

7. The method of claim 1, further comprising performing a preview scan.

8. The method of claim 1, further comprising:
   controlling a plurality of independently controllable sections of a light source of the image scanner based on the determined scan boundary.

9. The apparatus of claim 4, further comprising means for performing a preview scan.

10. The apparatus of claim 4, further comprising:
    means for controlling a plurality of independently controllable sections of a light source of the scanner according to the determined scan boundary.

11. A method, comprising:
    providing a document holder on a scan window of an image scanner;
    detecting a feature on the document holder; and
    determining a scan boundary based on the detected feature.

12. The method of claim 11, wherein detecting the feature on the document holder comprises sensing a pattern on the document holder.

13. The method of claim 11, wherein detecting the feature on the document holder comprises sensing a bulge portion of the document holder.

14. The method of claim 11, further comprising performing a preview scan.

15. The method of claim 11, further comprising:
    controlling a plurality of independently controllable sections of a light source of the image scanner according to the determined scan boundary.

16. An apparatus, comprising:
    a scan window; and
    a scan boundary determining portion capable of detecting a feature on a document holder disposed on the scan window, the feature corresponding to a scan boundary.

17. The apparatus of claim 16, wherein the document holder comprises a first surface configured to receive a document.

18. The apparatus of claim 17, wherein the document holder comprises a second surface housing of a configured to contact the scan window of the image scanner, the second surface comprising the feature corresponding to the scan boundary.

19. The apparatus of claim 16, further comprising:
a user interface capable of displaying a preview image of a document.

20. The apparatus of claim 16, further comprising:
a power supply configured to selectively provide power to a subset of a plurality of light sources of the image scanner based on the scan boundary.

21. The method of claim 1, wherein the scan boundary corresponds to a window in the document holder.

22. The method of claim 1, wherein the document holder comprises a first surface and a second surface, the second surface contacts the scan window, and the pattern is disposed on the second surface.

23. The method of claim 22, further comprising placing a document on the first surface of the document holder such that the document is aligned with a window in the document holder.

24. The apparatus of claim 4, wherein the scan boundary corresponds to a window in the document holder.

25. The apparatus of claim 4, wherein the means for holding a document comprises a first surface and a second surface, the second surface contacts the scan window, and the pattern is disposed on the second surface.

26. The apparatus of claim 16, further comprising a light source, wherein the light source is configured to selectively provide light to the scan window based on the scan boundary.

27. An assembly, comprising:

a scan window;

a plurality of document holders, each of the individual document holders having a scan boundary, a first surface configured to receive a document, a second surface, and a feature on the second surface corresponding to the scan boundary of the individual document holder;

a scan boundary determining portion capable of detecting the feature on a selected one of the plurality of document holders when the selected one of the document holders is disposed on the scan window; and a light source configured to selectively provide light to the scan window based on the scan boundary of the selected one of the document holders.

* * * * *

UNITED STATES PATENT AND TRADEMARK OFFICE
CERTIFICATE OF CORRECTION

PATENT NO. : 7,332,710 B2  Page 1 of 1
APPLICATION NO. : 11/504213
DATED : February 19, 2008
INVENTOR(S) : Yin-Chun Huang et al.

It is certified that error appears in the above-identified patent and that said Letters Patent is hereby corrected as shown below:

At column 8, line 64, after "surface" delete "housing of a".

Signed and Sealed this

Twenty-fifth Day of August, 2009

David J. Kappos
*Director of the United States Patent and Trademark Office*